Sept. 24, 1929.  J. G. DOW ET AL  1,729,067
EGG SEPARATOR
Filed April 13, 1927
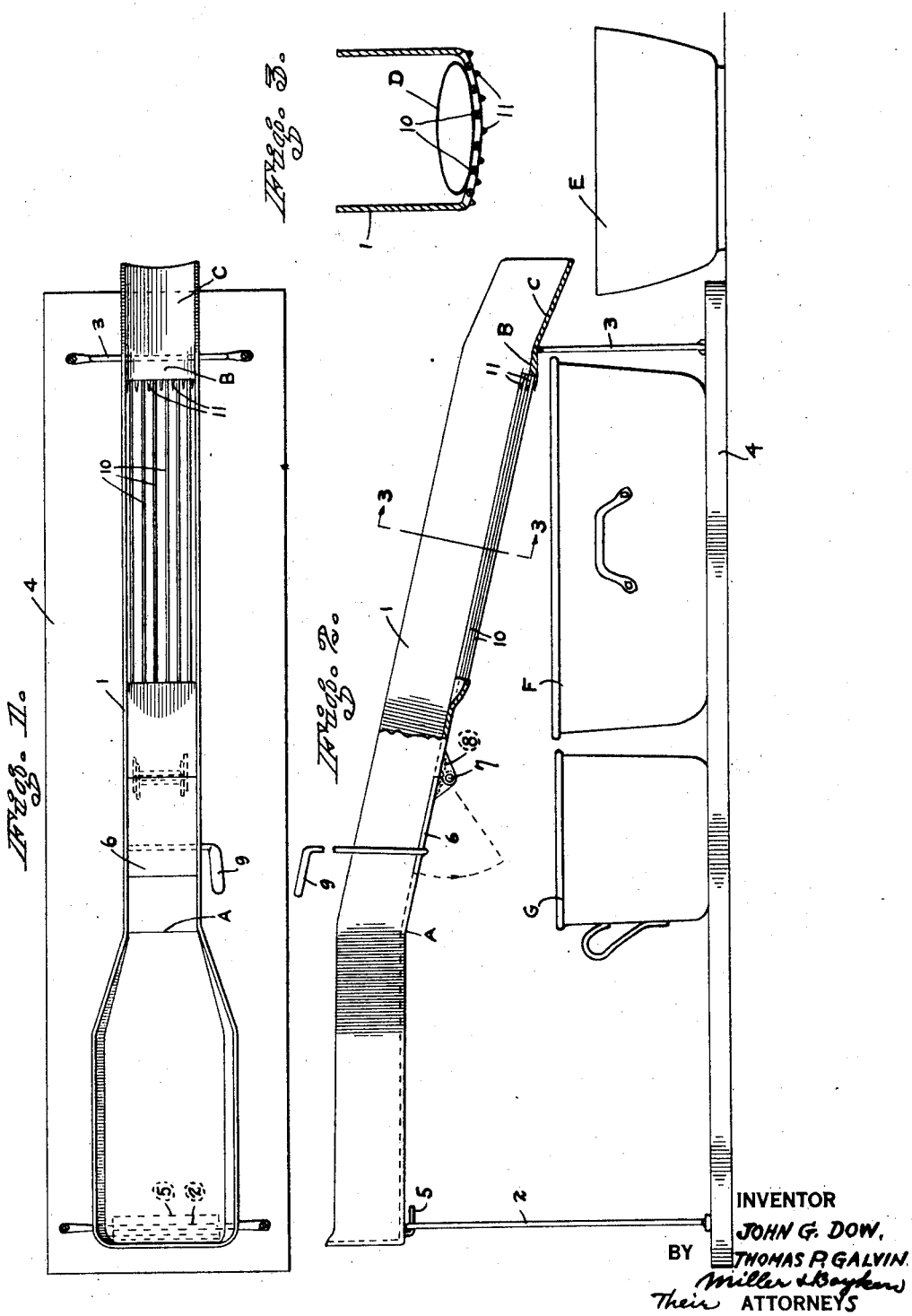
INVENTOR
JOHN G. DOW,
THOMAS P. GALVIN
BY Miller & Boykin
Their ATTORNEYS Patented Sept. 24, 1929

1,729,067

UNITED STATES PATENT OFFICE

JOHN G. DOW AND THOMAS P. GALVIN, OF SAN FRANCISCO, CALIFORNIA, ASSIGNORS OF ONE-THIRD TO JOHN C. BURDICK, OF SAN FRANCISCO, CALIFORNIA

EGG SEPARATOR

Application filed April 13, 1927. Serial No. 183,557.

This invention relates to culinary devices, and more particularly to a device for separating the yolks and whites of raw eggs preparatory to cooking or other use thereof, so that the yolks and whites may be used separately for any purpose.

The present method of separating whites and yolks of eggs is limited as far as can be learned to the breaking of the eggs so that the shell forms two halves and from which the whites are deftly drained while juggling the yolks from one half shell to the other, a purely manual operation requiring considerable skill.

The object of our invention is to provide a device operating on a new method for the purpose mentioned which will obviate the requirements for manual dexterity and which will more effectively perform the operation of separating the whites from the yolks, also such a device which will provide for discharge of a bad egg which may inadvertently be dropped into the apparatus, and withal such an apparatus which will be simple and easy to keep in a sanitary condition.

In the drawings accompanying this application Fig. 1 is a plan view of our egg separating device. Fig. 2 is a broken side elevation thereof and with several kettles in place. Fig. 3 is an enlarged cross section of the trough as taken along the line 3—3 of Fig. 2.

Briefly described the apparatus comprises an inclined trough into which the eggs are broken so that the eggs slide down the trough, the yolks passing over the end into a receptacle, while the whites are strained through a specially devised grating and fall into another receptacle. Means is provided on the grating for impaling or entangling the thick part of the white and pulling it from the yolk, and a trap-door is provided for quickly dropping out any bad eggs before they arrive at the grating.

In the drawings the trough is shown at 1 supported at an incline on legs 2, 3 secured to a baseboard 4.

The trough has very little incline at its upper end to the point A, a greater incline from this part downward to the point B where it is again reduced a trifle, then the incline is augmented at the terminating portion C.

A spring clip 5 at the upper end of the trough engages the highest leg 2 to retain it in position while permitting ready removal for washing.

Just below point A a trap-door 6 is provided which extends clear across the bottom and is pivoted at 7 to open downwardly as indicated by the dotted line, a spring 8 incorporated in the hinge of the door returns it to closed position, while a hand lever 9 extending upwardly provides a striker handle for quickly opening the door.

Between the trap-door and the point B the bottom is formed into a strainer grating by means of spaced wires 10 arranged in a curve or inverted arch across the width of the trough as best shown in Fig. 3, in practice the wires being set about $\frac{5}{16}$ of an inch apart as this has been found to properly support the yolks while permitting most of the whites to drain through.

The curved arrangement of the wires has been found to better preserve the yolk against breaking as they conform to the natural shape of the yolk when resting thereon as indicated at D in Fig. 3.

At the lower end of the drainage wires we provide a series of sharp prongs 11 which impale the thick portions of the whites and drag it from the yolk, the extra incline to the bottom at point C giving the sliding yolk an extra impetus to aid in tearing itself free of the whites entangled upon the prongs.

In operation, the eggs are broken into the upper end of the trough and slowly slide down, discharging the yolks from the lower end into a receptacle as at E, while the whites separate through the grating into a receptacle F, and any bad egg is dropped through the trap-door into the receptacle G.

In practice, one operator can easily maintain a steady stream of eggs down the trough with much better separation of whites and yolks than possible by the hand method now practiced and at over a dozen times the speed.

We claim:

1. Apparatus for separating the whites and yolks of shelled raw eggs comprising an inclined trough provided with spaced bars running longitudinally forming drainage openings along a portion of its surface adapted to pass the white of an egg while retaining the yolk thereon, and prongs adjacent the lower end of said drainage openings adapted to impale the heavy portion of the white for stripping it from the yolk.

2. In an apparatus of the character described, an inclined trough, the upper portion provided with a plain bottom, a lower portion provided with a bottom formed of spaced bars running longitudinally of the trough and a terminating plain portion and upwardly directed prongs positioned between the bars at the lower end thereof.

3. In an apparatus of the character described, an inclined trough, the upper portion provided with a substantially horizontal flat plain bottom, and a lower portion reduced in width and provided with a bottom formed of spaced bars running longitudinally of the trough and terminating in a plain portion of increased downward inclination.

4. In an apparatus for separating the whites and yolks of shelled raw eggs, an inclined trough, the upper portion provided with a plain bottom, an intermediate portion provided with a bottom of spaced bars running longitudinally of the trough, followed by a plain bottom of lesser inclination than the bars, a terminating plain bottom portion of increased downward inclination, and prongs adjacent the lower ends of and between said longitudinally spaced bars adapted to impale the white of an egg for stripping it from the yolk.

JOHN G. DOW.
THOMAS P. GALVIN.